Figure 3:
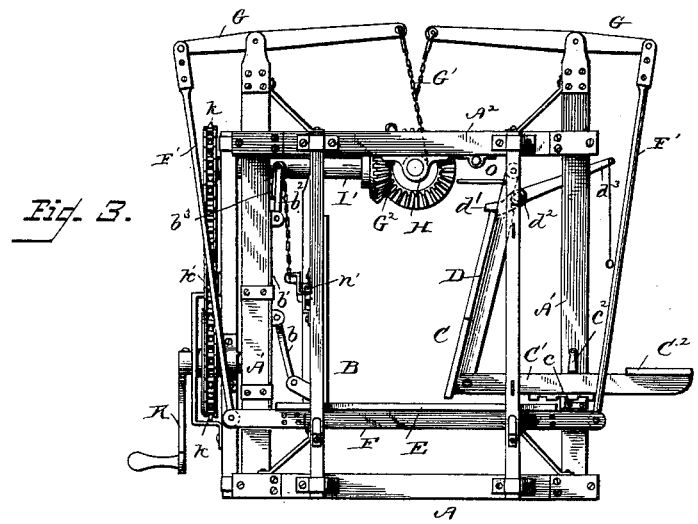

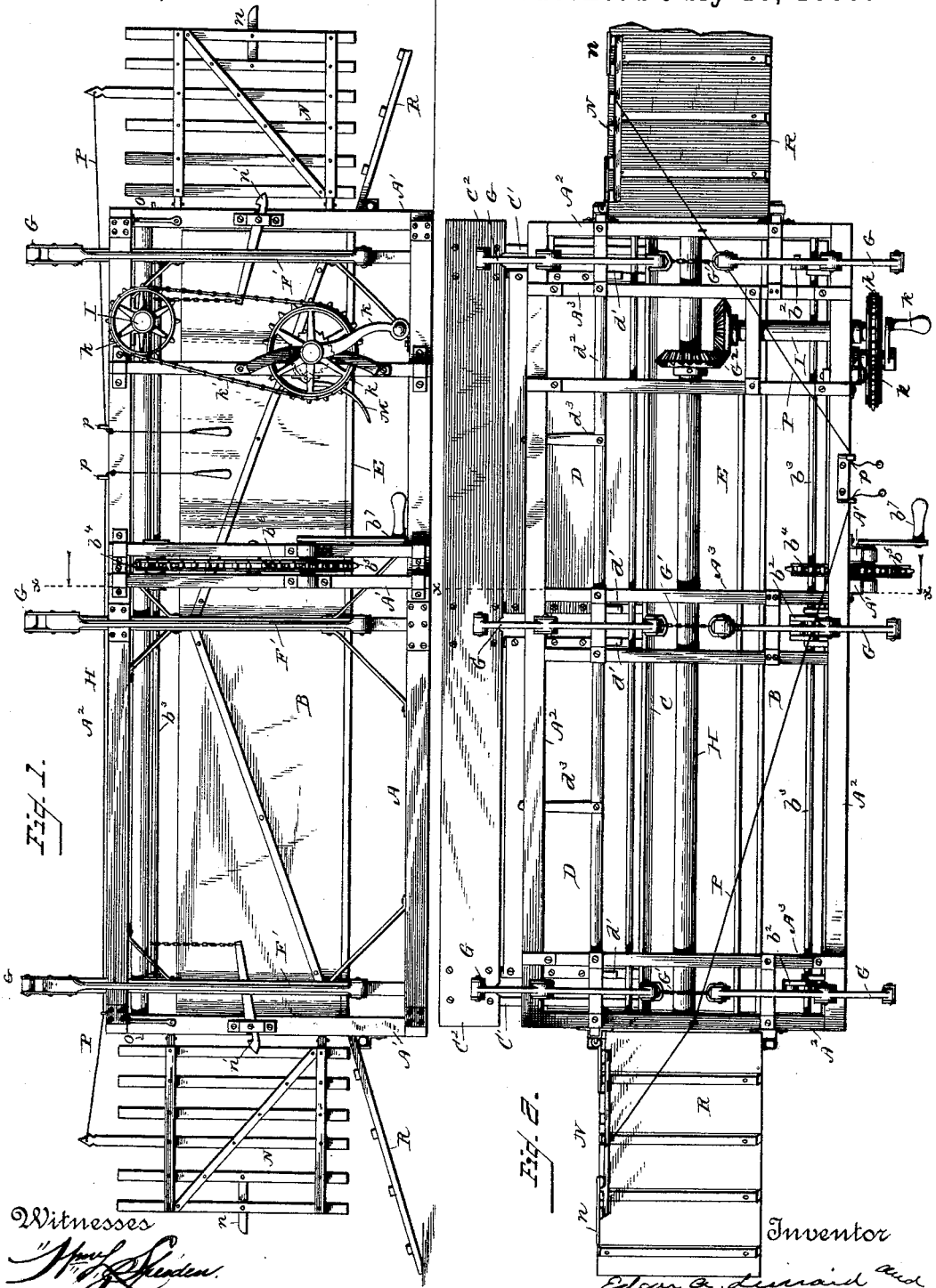

(No Model.) 2 Sheets—Sheet 2.

E. A. LEINARD & G. W. SHEETS.
BRANDING CHUTE.

No. 406,920. Patented July 16, 1889.

UNITED STATES PATENT OFFICE.

EDGAR A. LEINARD AND GEORGE W. SHEETS, OF KARLE, OHIO.

BRANDING-CHUTE.

SPECIFICATION forming part of Letters Patent No. 406,920, dated July 16, 1889.

Application filed January 5, 1889. Serial No. 295,513. (No model.)

*To all whom it may concern:*

Be it known that we, EDGAR A. LEINARD and GEORGE W. SHEETS, both of Karle, in the county of Williams and State of Ohio, have invented certain new and useful Improvements in Branding-Chutes; and we do hereby declare the following to be a full, clear, and exact description of the same, reference being had to the accompanying drawings, forming a part of this specification, and to the figures and letters of reference marked thereon.

The present invention relates to that class of apparatus employed in branding cattle, horses, &c., in which the animals are driven into an inclosure, one or more at a time, and the walls of the inclosure brought together to hold the animals while the branding-iron is being applied, and prevent their rearing and kicking, to the injury of either the attendants, the other animals, or themselves, such apparatus usually being made in the form of a long stall closed at both ends by gates, enabling the branding operations to be carried on continuously and expeditiously, as the animals can be driven in at one end and out at the other, thus not only facilitating the operations, but enabling the attendants to keep the branded animals separated from those waiting to be branded without difficulty.

The invention has for its object to greatly improve the construction of the apparatus, enabling more animals to be handled with less trouble and risk to the attendants or the animals themselves; also to bring the operating parts of the various parts within the reach of a single attendant, who is thus enabled to secure the animals without the necessity of moving from place to place.

With these objects in view the invention consists in an apparatus in which the sides are adjustable to accommodate animals of different sizes, being for this purpose preferably constructed with one side adjustable for the purpose mentioned, while the opposite side is movable for the purpose of securing the animals, the latter side being pivoted at the top instead of at the bottom, as heretofore, in order to allow of a wider space, into which the animals can pass without intimidation, the bottom on which the animals stand being made adjustable, whereby it may be lowered after the sides are brought together, leaving the animals wholly or partially suspended clear of the bottom, whereby the danger of their rearing or injuring themselves is greatly lessened.

The invention further consists in certain novel details of construction and combinations and arrangements of parts, all as will be hereinafter described, and pointed out particularly in the claims at the end of this specification.

Figure 4:
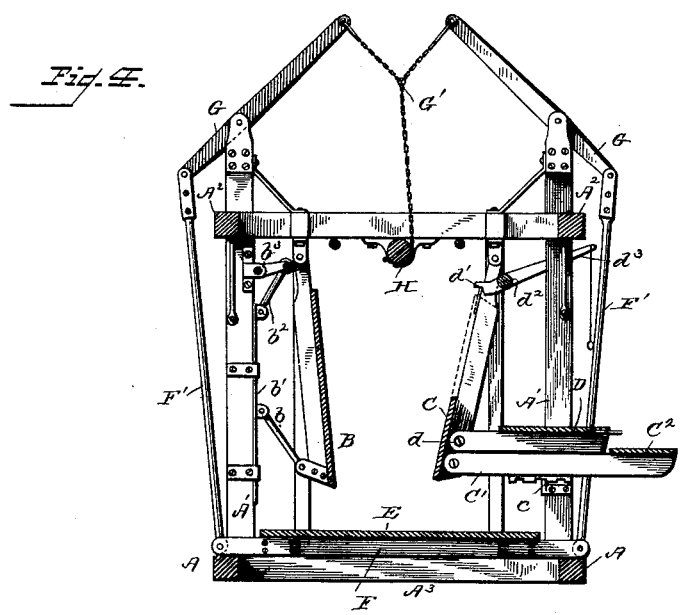

Referring now to the accompanying drawings, Figure 1 is a side elevation of an apparatus constructed in accordance with our invention. Fig. 2 is a top plan view of the same. Fig. 3 is an end elevation with the bottom raised and side or branding door closed. Fig. 4 is a cross-sectional view with the bottom and side or branding door down.

Similar letters of reference in the several figures indicate the same parts.

A rectangular frame is preferably formed, which supports and contains all the operative parts of the apparatus, said frame consisting of the four sill-pieces A, uprights A', top pieces $A^2$, and cross-pieces $A^3$ at top and bottom to afford the necessary lateral strength. Within this rectangular frame are the side pieces B C, which form the chute or stall into which the cattle are driven. This side B is pivoted, preferably, to the top cross-pieces $A^3$ at suitable intervals and swings in and out at the bottom, such movements being imparted thereto, when it is desired to narrow or widen the chute to hold or release the animals, by the arms $b$, pivoted thereto and at their opposite ends pivoted to the slides $b'$, the latter being in turn connected by rods or arms $b^2$ to the cranked shaft $b^3$, which extends throughout the entire length of the machine, there being as many of the connections such as described between the shaft and side as are found necessary or desirable to give the necessary strength. Usually, however, three are found sufficient, as the side is strong enough to support an animal between the connections. The shaft $b^3$ is rotated in one direction or the other through the medium of the sprocket-wheels $b^4$ $b^5$ with the connecting-chain and crank-handle $b^6$ $b^7$, respectively, the sprocket-wheel $b^5$ being journaled in the uprights A', as shown. By this arrangement it will be seen that when the side is thrown out, as shown in Fig. 3, a broad passage is left for the animals, into which they will enter without fear, and after they are in the side may be quickly and easily forced inward, holding them securely. The other side C is also pivoted, preferably at the top, but instead of being movable, to secure the animals, is held rigidly in adjusted position by the arms or supports C', pivoted thereto at the lower edge and resting near their outer ends on supports secured to the upright side pieces, the extreme ends of the supports serving to hold the platform $C^2$, upon which the person who is to do the branding may walk from end to end of the apparatus.

The connections between the supports C' and the uprights A' are adjustable, permitting the side C to be moved in or out to accommodate cattle of different sizes, said connections preferably being formed by pins $c$ or their equivalents secured to the uprights, with notches in the under sides of the supports for fitting over the same, if desired, turn-buckles or stops $c^2$ being located above the supports to hold them down on the pins in adjusted position, the stops themselves being readily turned up when it is desired to shift the position of the supports.

The side C is formed with doors D at the top, hinged thereto at their lower edges, as at $d$, so as to swing down to expose one side of the animal for branding, as shown in full lines, Fig. 4. The catches for holding the doors D closed are located at two or more different points and consist of the pivoted gravitating pawls $d'$, supported by the shaft $d^2$ and engaging the upper edge of the doors, all of those operating on one door being released simultaneously by turning the handle $d^3$, attached to the shaft $d^2$.

When swung down, the doors D rest on the supports C' on substantially the same level as the platform $C^2$, and constitute when in this position extensions of the said platform, enabling the operator to get up close to the animals.

The bottom of the apparatus E, upon which the animals are driven, normally is at substantially the level of the bottom edges of the sides, or is in this position when the animals are driven in, the cross-timbers F at the bottom serving to hold it in this position through the mechanism which will now be described.

The ends of the cross-pieces F are preferably bifurcated or have metal pieces secured thereto, which surround the uprights A', and have connected to their outer ends connecting-rods F', which extend upward and are connected to the shorter arms of levers G, pivoting on the tops of the uprights. The longer arms of the levers G, which project over the center of the apparatus, are connected by chains or flexible connections G' to the shaft H, extending throughout the entire length of the apparatus, and are adapted, when the said shaft is rotated, to wind around the same and draw the ends of the levers down, elevating the bottom, or when said shaft is turned in the opposite direction to permit the floor to descend, as will be readily understood. The shaft H is rotated by the beveled cog-wheels $G^2$, one secured on the shaft and one on the cross-shaft I, the latter being rotated by the crank-handle K, connected thereto through the medium of the sprocket-wheels $k$ and chain $k'$. The pawl M, engaging the ratchet-wheel on the sprocket-wheel $k$, serves to maintain the bottom in elevated position while the cattle are being driven in, its extended lower end serving as a handle to throw the same out of engagement with the ratchet-wheel when it is desired to lower the bottom, as when this is to be done there is a very great weight on the same.

The doors or gates N are located at each end of the apparatus, and are hinged to an upright extending between the top and bottom timbers. They are provided at their forward ends with latches $n$, engaging the pivoted catches $n'$ on the uprights, the inner ends of the catches being connected through a flexible connection with the shaft $b^3$. Thus when the said shaft is rotated to move the side outward and release the animals the flexible connection will be wound up and the catches elevated, permitting the gates to swing open and the animals to pass out.

The gates are preferably swung open by springs—such as O—but it is obvious that other well-known means may be employed for accomplishing the same result.

In order to facilitate the closing of the gates when the animals are driven in, a cord or rope P extends from the top of each gate through the eyes $p$ to a position in proximity to the position the operator occupies when operating the crank-handles to manipulate the side and bottom, whereby he is enabled to close one or both the gates without leaving his position, and need not close either of them until after the animals have started into the chute, as they would be all the more likely to enter without trouble should they see the way clear for an escape.

Inclines R are preferably provided at each end to enable the animals to readily walk up onto the floor when elevated.

The operation of the apparatus will now be readily understood, and is as follows: The cattle or other animals having been corraled, are driven into the apparatus, one, two, or more at a time, according to its capacity, and the gates closed. The movable side is then moved inward to the proper point, or until the arms $b$ are substantially level, which will hold the side in position, as the thrust will be directly outward against the side pieces; but other means of holding the side may be employed. The bottom is then lowered, leaving the cattle partially or wholly suspended and clamped tightly in position. After this the doors D are lowered, exposing the side of the animal for the marking-brand, and the operator may now fearlessly approach close to the animal to apply the same.

It is obvious that many of the details of the construction of the apparatus, as well as the mechanism for carrying the various steps into operation, may be greatly changed and modified without departing from the spirit of our invention, and we do not wish to be understood as limiting ourselves to the specific constructions and combinations shown and described.

Having thus described our invention, what we claim as new is—

1. In a branding-chute, the combination, with the frame, of the movable side, the arm pivotally connected therewith for moving the same, and the cranked shaft and connections for moving the arm, substantially as described.

2. In a branding-chute, the combination, with the frame, of the sides between which the animals are clamped, both pivoted at the top to the frame, a catch or lock for holding one side rigidly in position, and the crank-shaft and connections for moving the opposite side toward and from the same to secure the animals, substantially as described.

3. In a branding-chute, the combination, with the frame, of the movable sides between which the animals are held, and the substantially horizontal supports or timbers connected to one side and adjustably connected to the frame for holding the side rigidly in adjusted position, and mechanism for moving the opposite side toward and from said first-mentioned side, substantially as described.

4. In a branding-chute, the combination, with the sides movable toward and from each other to hold the animals, of the supports or timbers secured to one side and adjustable connections between said supports and the uprights, and the platforms or walks on the ends of the supports, substantially as described.

5. In a branding-chute, the combination, with the sides pivoted at the top and movable toward and from each other to hold the animals, of the supports or timbers connected to one side, an adjustable connection between the supports and the uprights, and mechanism for moving the opposite side toward and from said first-mentioned side, substantially as described.

6. In a branding-chute, the combination, with the sides pivoted at the top and movable toward and from each other to hold the animals, of the supports or timbers connected to one side and adjustably connected to the frame, the arm for moving the opposite side, and the cranked shaft and connections for imparting motion to the arms, substantially as described.

7. In a branding-chute, the combination, with the movable side for securing the animals, of the arms connected thereto, the slides connected to said arms, the cranked shaft connected to the slides, and the crank-handle for rotating the said shaft, whereby the side may be moved, substantially as described.

8. In a branding-chute, the combination, with the movable sides and the supports or timbers for holding the same in adjusted position, of the branding-doors in the side, hinged at the bottom and resting on said supports or timbers, when open in horizontal position, to form platforms, substantially as and for the purpose specified.

9. In a branding-chute, the combination, with the branding-door, of the catches therefor, formed by the pawls engaging the door at different points and secured on a common shaft, whereby they are moved simultaneously to release the door, substantially as described.

10. In a branding-chute, the combination, with the sides between which the animals are held, converging toward the bottom, of the vertically-movable bottom on which the animals are driven, located below the sides, and operating, when lowered, to leave the animals supported by the sides, substantially as described.

11. In a branding-chute, the combination, with the sides between which the animals are held, adjustable toward each other to secure the animals, of the vertically-movable bottom on which the animals are driven, located below the sides and operating, when lowered, to leave the animals supported by the sides, substantially as described.

12. In a branding-chute, the combination, with the sides between which the animals are held—one stationary and the other movable toward and from the same—of the vertically-movable bottom on which the animals are driven, located below the sides, and operating, when lowered, to leave the animals supported between the sides, substantially as described.

13. In a branding-chute, the combination, with the frame, of the movable bottom, the shaft extending longitudinally of the frame and the chains connected thereto, and connections between said chains and the movable bottom for raising the same, substantially as described.

14. In a branding-chute, the combination, with the frame, the movable bottom, and the levers connected therewith, of the shaft and the chains connected thereto and to the said levers for raising the bottom, substantially as described.

15. In a branding-chute, the combination, with the frame, the movable bottom and shaft at the top of the frame, extending longitudinally of the same, and connections between said shaft and the bottom for moving the same, of the sprocket-wheel on the lower portion of the frame, having the crank-handle, the chain, a gearing, and connections uniting the sprocket-wheel and shaft for rotating the same, substantially as described.

16. In a branding-chute, the combination, with the adjustable side and the shaft and connections for moving the same, of the gates and the catches therefor connected to the shaft, whereby when the shaft is rotated to move the side back the gate will be released, substantially as described.

17. In a branding-chute, the combination, with the movable sides and bottom and the crank-handles, and connections between said handles and the side and bottom for moving the side and bottom, respectively, of the gates and cords extending therefrom to a point in proximity to the crank-handles, whereby the operator may close the gates without leaving his station, substantially as and for the purpose set forth.

EDGAR A. LEINARD.
GEORGE W. SHEETS.

Witnesses:
WILLIAM H. ROOXE,
JOHN W. LEIDIGH.